March 8, 1927.  1,620,569
A. N. QUICK
DETACHABLE ANTIGLARE LENS
Filed Oct. 16, 1925
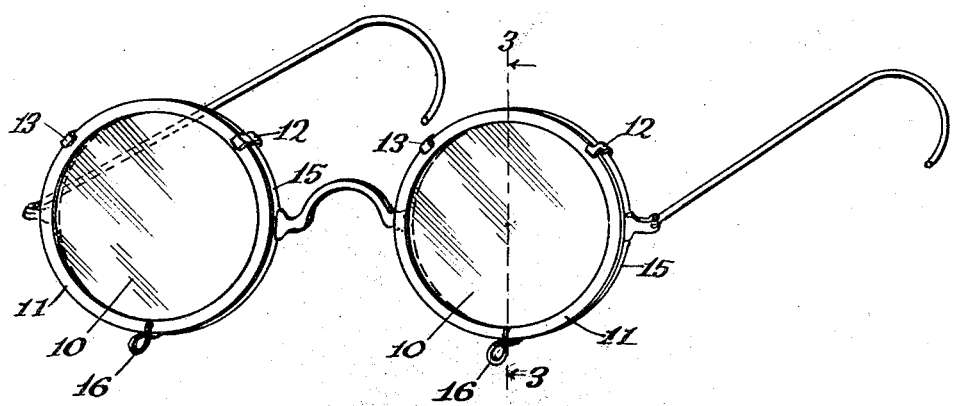
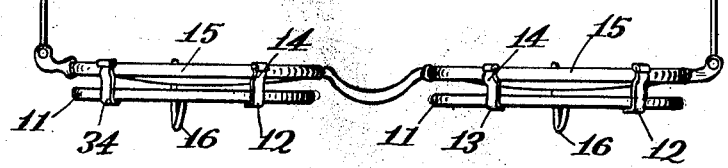
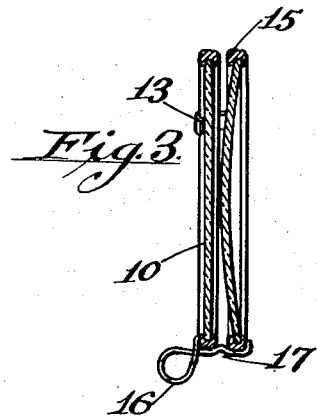
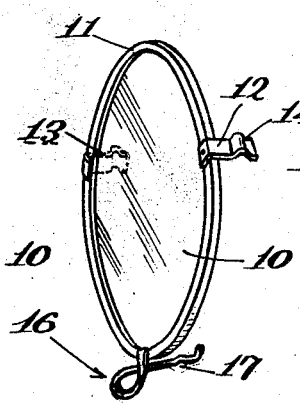
Inventor.
Aaron N. Quick.
by Hazard and Miller
Attorneys.

Patented Mar. 8, 1927.

1,620,569

UNITED STATES PATENT OFFICE.

AARON N. QUICK, OF LOS ANGELES, CALIFORNIA.

DETACHABLE ANTIGLARE LENS.

Application filed October 16, 1925. Serial No. 62,778.

This invention relates to improvements in anti-glare lenses adapted to be readily attached to and detached from the lenses of a pair of spectacles or the like.

An object of this invention is to provide an improved form of anti-glare lens which may be formed of stained glass or the like and which is so constructed that it may be easily and quickly attached to the lens of a pair of spectacles.

With the foregoing and other objects in view which will be made manifest in the following detailed description and specifically pointed out in the appended claims, reference is had to the accompanying drawings for an illustrative embodiment of the invention, wherein:

Figure 1 is a perspective view illustrating a pair of spectacles to which a pair of anti-glare lenses of the improved construction have been applied, Fig. 2 is a top plan view of the spectacles shown in Fig. 1, Fig. 3 is a vertical section taken substantially on the line 3—3 of Fig. 1, and Fig. 4 is a perspective view of one of the improved lenses.

Referring to the accompanying drawings wherein similar reference characters designate similar parts throughout, the improved anti-glare lens consists of a section of semi-transparent material 10, which may be formed of stained glass or the like. Around the periphery of this lens there is preferably arranged a rim 11 which may be formed of any desirable material, such as hard rubber or equivalent composition. A pair of relatively rigid or stiff clips 12 and 13 are fastened to the rim 11, and thus mounted upon the lens adjacent the top thereof. These clips are preferably formed of small strips of sheet metal or the like having their ends secured against the forward side of the rim 11 and are bent rearwardly across the edge of the rim. Adjacent their rear ends they are preferably crimped, as indicated at 14, to form a channel capable of partially receiving the rim or edge 15 of the spectacle lenses. If desired, the extreme ends of these strips may be reversely bent, as clearly shown in Fig. 2, to provide smooth curved surfaces or curved ends. Adjacent the bottom of the anti-glare lens there is secured a resilient clip, generally designated by the reference character 16. This resilient clip is formed of a section of sheet metal having one end secured to the rim 11 and extending downwardly and forwardly therefrom, that is, outwardly from the center of the lens 10. The strip is then bent upwardly and rearwardly beneath the bottom edge of the rim and this reversely bent portion is also provided with a crimp such as is indicated at 17. It will be readily appreciated that by so bending the strip of resilient material, forming the resilient clip 16, there is a considerable degree of resiliency or spring to the reversely bent portion.

The anti-glare lenses may be fastened to the spectacle lenses by placing the clips 12 and 13 against the upper portions of the rim 15 and then springing the backwardly bent portion of the resilient clip 16 downwardly a sufficient distance to permit it to spring over the bottom of the spectacle lens 15. It will be readily apparent that if desirable the backwardly bent portion of the resilient clip 16 may be first applied to the frame 15, and the lens 10 can then be shifted bodily upwardly. springing this backwardly bent portion downwardly a sufficient distance to permit the clips 12 and 13 to be passed over the edge of the rim 15.

From the above described construction it will be appreciated that an improved anti-glare lens is provided which can be easily and quickly applied to the spectacle lens and which will be resiliently held in position thereon.

It will be understood that various changes may be made in the detail of construction without departing from the spirit or scope of the invention as defined by the appended claims.

I claim:

1. An anti-glare lens adapted to be applied to a spectacle lens comprising a lens formed of semi-transparent material, a pair of relatively rigid clips mounted upon the anti-glare lens adjacent the top thereof, and a resilient clip mounted adjacent the bottom thereof, said resilient clip consisting of a small strip of resilient material having one end secured to the anti-glare lens and extending downwardly and forwardly therefrom, and then being bent upwardly and backwardly beneath the bottom edge of the lens, said clips being adapted to engage upon the rim of a spectacle lens so as to mount said anti-glare lens thereon.

2. An anti-glare lens adapted to be applied to a spectacle lens comprising a lens formed of semi-transparent material, said lens having a resilient clip mounted thereon, said resilient clip consisting of a small strip of resilient material having one end secured to the anti-glare lens adjacent the edge thereof and extending outwardly from the edge of the lens and forwardly therefrom, and then being bent inwardly toward the edge of the lens and backwardly across the edge of the lens, the end of the strip being bent inwardly and there being a crimp adjacent the end cooperating with the bent end to define a channel adapted to partially receive the rim of the spectacle lens in applying the anti-glare lens thereto.

In testimony whereof I have signed my name to this specification.

A. N. QUICK.